United States Patent
Harrington et al.

(10) Patent No.: US 10,473,163 B2
(45) Date of Patent: Nov. 12, 2019

(54) TORQUE-LIMITER HEALTH MONITORING

(71) Applicant: Hamilton Sundstrand Corporation, Charlotte, NC (US)

(72) Inventors: Erik Harrington, Machesney Park, IL (US); David G. Hill, Rockford, IL (US); Rachel Gallagher, Rockford, IL (US); Cory M. Crandall-Seibert, Delavan, WI (US); Victor Barger, Lake in the Hills, IL (US); Timothy Michael Mayer, Belvidere, IL (US); Artemio Pérez, Loves Park, IL (US); Christian Miller, Beloit, WI (US); Yuniya S. Bishop, Dixon, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 150 days.

(21) Appl. No.: 15/683,400

(22) Filed: Aug. 22, 2017

(65) Prior Publication Data
US 2019/0063508 A1 Feb. 28, 2019

(51) Int. Cl.
| | |
|---|---|
| *F16D 7/08* | (2006.01) |
| *F16D 3/22* | (2006.01) |
| *F16D 7/00* | (2006.01) |
| *F16D 7/10* | (2006.01) |
| *G05B 23/02* | (2006.01) |
| *F16D 43/206* | (2006.01) |
| *G01B 21/16* | (2006.01) |
| *G01M 13/022* | (2019.01) |

(Continued)

(52) U.S. Cl.
CPC ............ *F16D 7/08* (2013.01); *F16D 3/22* (2013.01); *F16D 7/005* (2013.01); *F16D 7/10* (2013.01); *F16D 43/206* (2013.01); *G01B 21/16* (2013.01); *G01M 13/022* (2013.01); *G05B 23/0283* (2013.01); *B64D 45/00* (2013.01); *B64D 2045/0085* (2013.01); *F16H 2035/106* (2013.01)

(58) Field of Classification Search
CPC ... F16D 7/08; F16D 7/10; F16D 7/005; F16D 43/206; F16D 3/22; G01M 13/022; G01B 21/16; G05B 23/0283; B64D 45/00; B64D 2045/0085; F16H 2035/106
USPC ....................................................... 73/865.9
See application file for complete search history.

(56) References Cited

U.S. PATENT DOCUMENTS

| | | |
|---|---|---|
| 4,176,733 A | 12/1979 | Twickler |
| 4,317,424 A | 3/1982 | Steadman |

(Continued)

FOREIGN PATENT DOCUMENTS

| | | |
|---|---|---|
| EP | 2666716 A2 | 11/2013 |
| EP | 2960152 A1 | 12/2015 |

OTHER PUBLICATIONS

Search Report dated Jan. 22, 2019, EP Application No. EP18189723, 7 pages.

*Primary Examiner* — Nathaniel T Woodward
(74) *Attorney, Agent, or Firm* — Cantor Colburn LLP

(57) ABSTRACT

A predictive system is provided and include a torque-limiter, a sensor disposed to sense a condition of the torque-limiter and a processing system. The processing system is coupled to the sensor and configured to process readings of the sensor, to calculate whether the condition of the torque-limiter is indicative of degradation or failure incidents based on the readings being processed and to determine whether an action should be taken based on a calculation result.

15 Claims, 5 Drawing Sheets

(51) Int. Cl.
*F16H 35/10* (2006.01)
*B64D 45/00* (2006.01)

(56) References Cited

U.S. PATENT DOCUMENTS

| | | | |
|---|---|---|---|
| 4,578,993 A * | 4/1986 | Burandt | B64C 13/28 |
| | | | 192/129 A |
| 5,545,109 A | 8/1996 | Hayakawa | |
| 7,114,601 B2 | 10/2006 | Mayer et al. | |
| 8,393,442 B2 | 3/2013 | Lang et al. | |
| 8,978,840 B2 | 3/2015 | Lang et al. | |
| 9,651,126 B2 | 5/2017 | Lang et al. | |
| 2015/0076283 A1 * | 3/2015 | Schievelbusch | B64C 9/18 |
| | | | 244/99.3 |

* cited by examiner

Torque limiter separate from actuator housing

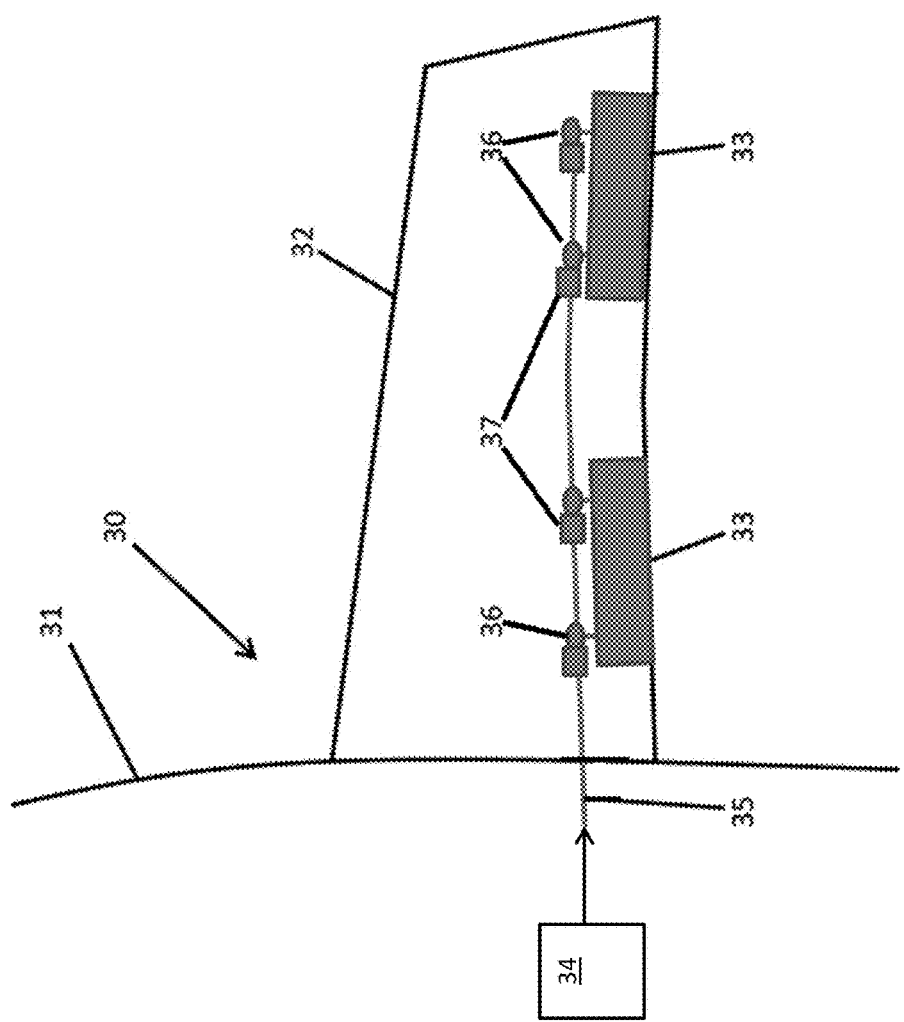

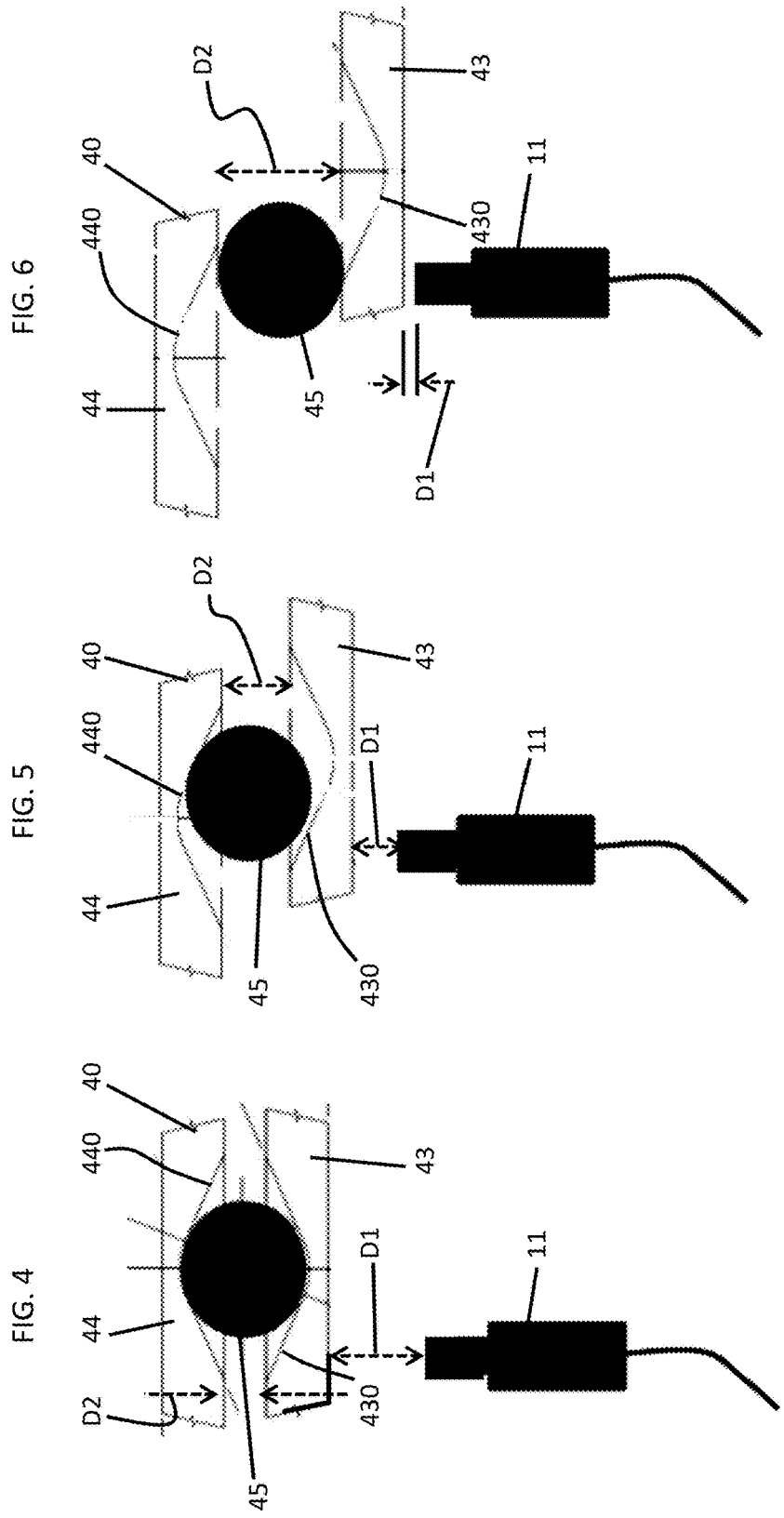

TORQUE-LIMITER HEALTH MONITORING

BACKGROUND

The following description relates to torque-limiters and, more specifically, to health monitoring of aircraft and non-aircraft actuation systems.

Preventative maintenance in actuation systems is becoming increasingly important in various fields, including, for example, aircraft technologies as airlines strive to increase operational efficiency. One way to achieve this goal is to have a predictive system available to anticipate failures before they occur. Currently, on-condition service results in unscheduled repairs with potential delays due to parts and maintenance crews being unavailable right away. On the other hand, predictive systems allow operators to make arrangements for repair (e.g., by obtaining parts and ensuring availabilities of maintenance crews) in advance and thus reduce time required to return an aircraft to service. Advanced planning can also reduce inventories for operator or service centers as parts can be ordered ahead of repair times.

BRIEF DESCRIPTION

According to an aspect of the disclosure, a predictive system is provided and includes a torque-limiter, a sensor disposed to sense a condition of the torque-limiter and a processing system. The processing system is coupled to the sensor and configured to process readings of the sensor, to calculate whether the condition of the torque-limiter is indicative of degradation or failure incidents based on the readings being processed and to determine whether an action should be taken based on a calculation result.

In accordance with additional or alternative embodiments, the torque-limiter comprises a ball-ramp mechanism.

In accordance with additional or alternative embodiments, the torque-limiter and the sensor are mounted in a housing.

In accordance with additional or alternative embodiments, the sensor includes at least one or more proximity sensors.

In accordance with additional or alternative embodiments, the at least one or more proximity sensors include at least one or more of an optical sensor, an electromagnetic sensor, a Hall Effect sensor, a linear variable differential transformer (LVDT) sensor and a capacitive sensor.

In accordance with additional or alternative embodiments, the processing system includes at least one or more of a controller and a prognostic maintenance computer.

In accordance with additional or alternative embodiments, the processing system calculates that the condition of the torque-limiter is indicative of the degradation or failure incidents based on the condition exceeding a first threshold or reaching a second threshold, respectively.

In accordance with additional or alternative embodiments, the action includes arranging maintenance.

According to another aspect of the disclosure, a predictive system is provided for use with a ball-ramp mechanism. The ball-ramp mechanism includes a first plate to which an input shaft is coupled, a second plate to which an output shaft is coupled and a ball element which is disposable within complementary recesses in the first and second plates. The predictive system includes a sensor disposed to sense a distance between the first and second plates in a dimension defined along a longitudinal axis of the input and output shafts and a processing system. The processing system is coupled to the sensor and configured to process readings of the sensor, to calculate whether the distance between the first and second plates is indicative of degradation or failure incidents based on the readings being processed and to determine whether an action should be taken based on a calculation result.

In accordance with additional or alternative embodiments, the ball-ramp mechanism and the sensor are mounted in a housing.

In accordance with additional or alternative embodiments, the sensor includes at least one or more proximity sensors.

In accordance with additional or alternative embodiments, the at least one or more proximity sensors include at least one or more of an optical sensor, an electromagnetic sensor, a Hall Effect sensor, a linear variable differential transformer (LVDT) sensor and a capacitive sensor.

In accordance with additional or alternative embodiments, the processing system includes at least one or more of a controller and a prognostic maintenance computer.

In accordance with additional or alternative embodiments, the processing system calculates that the distance between the first and second plates is indicative of the degradation or failure incidents based on the distance exceeding a first threshold or reaching a second threshold, respectively.

In accordance with additional or alternative embodiments, the action includes arranging maintenance based on the condition of the torque-limiter being indicative of torque-limiter degradation.

According to yet another aspect of the disclosure, a method of operating a predictive system for a torque-limiter is provided. The method includes sensing a condition of the torque-limiter, calculating whether the condition of the torque-limiter is indicative of degradation or failure incidents and determining whether an action should be taken based on a calculation result.

In accordance with additional or alternative embodiments, the torque-limiter includes a ball-ramp mechanism and the condition includes a distance between plates of the ball-ramp mechanism.

In accordance with additional or alternative embodiments, the calculating includes calculating that the distance exceeds a first threshold without reaching a second threshold and determining that the condition is indicative of the degradation incident based on the distance exceeding the first threshold without reaching the second threshold.

In accordance with additional or alternative embodiments, the calculating includes calculating that the distance reaches the second threshold and determining that the condition is indicative of the failure incident based on the distance reaching the second threshold.

In accordance with additional or alternative embodiments, further comprising taking the action based on a result of the determination of whether to take the action.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

FIG. 1B is a partially cutaway top-down view of a portion of an aircraft in accordance with alternative embodiments;

FIG. 4 is an illustration of an operation of the predictive and processing systems of FIGS. 2 and 3;

FIG. 5 is an illustration of an operation of the predictive and processing systems of FIGS. 2 and 3;

FIG. 6 is an illustration of an operation of the predictive and processing systems of FIGS. 2 and 3.

These and other advantages and features will become more apparent from the following description taken in conjunction with the drawings.

DETAILED DESCRIPTION

As will be described below, a predictive system is provided and may be used with a torque-limiter or another suitable similar mechanism. In the case of the predictive system being used with a torque-limiter and in the case of the torque-limiter being provided as a ball-ramp mechanism, the predictive system includes a sensor that monitors changes in the available system torque over time using a spring-loaded ball-ramp mechanism. The sensor can be located at various points along a driveline, in a power drive unit or in an actuator. Under normal conditions, the ball-ramp mechanism allows torque to be passed from one shaft to another shaft without its plates moving relative to one another. However, if torque exceeds a predefined value, the balls of the ball-ramp mechanism will rise in the pockets of the plates and push the plates apart. In conventional applications, the ball-ramp mechanism will provide for a visual indication after an incident of the plates being pushed apart. This visual indication must be observed manually requiring time and, in some cases, the removal of surrounding paneling. In the predictive system, however, the sensor can continuously monitor relative plate movement and send signals that are indicative of relative plate movement to a processing system. The processing system can then determine whether the relative plate movement is greater than a predetermined threshold without exceeding overload limits while taking into consideration component wear over time and other similar issues. In addition, the processing system can take an action based on its determination so as to avoid or prevent overload conditions.

With reference to FIGS. 1A, 1B, 2 and 3, a predictive system 10 (see FIGS. 2 and 3) is provided for use with a torque-limiter, such as a ball-ramp mechanism or another similar mechanism of an aircraft 30, for example.

Figure 1A:
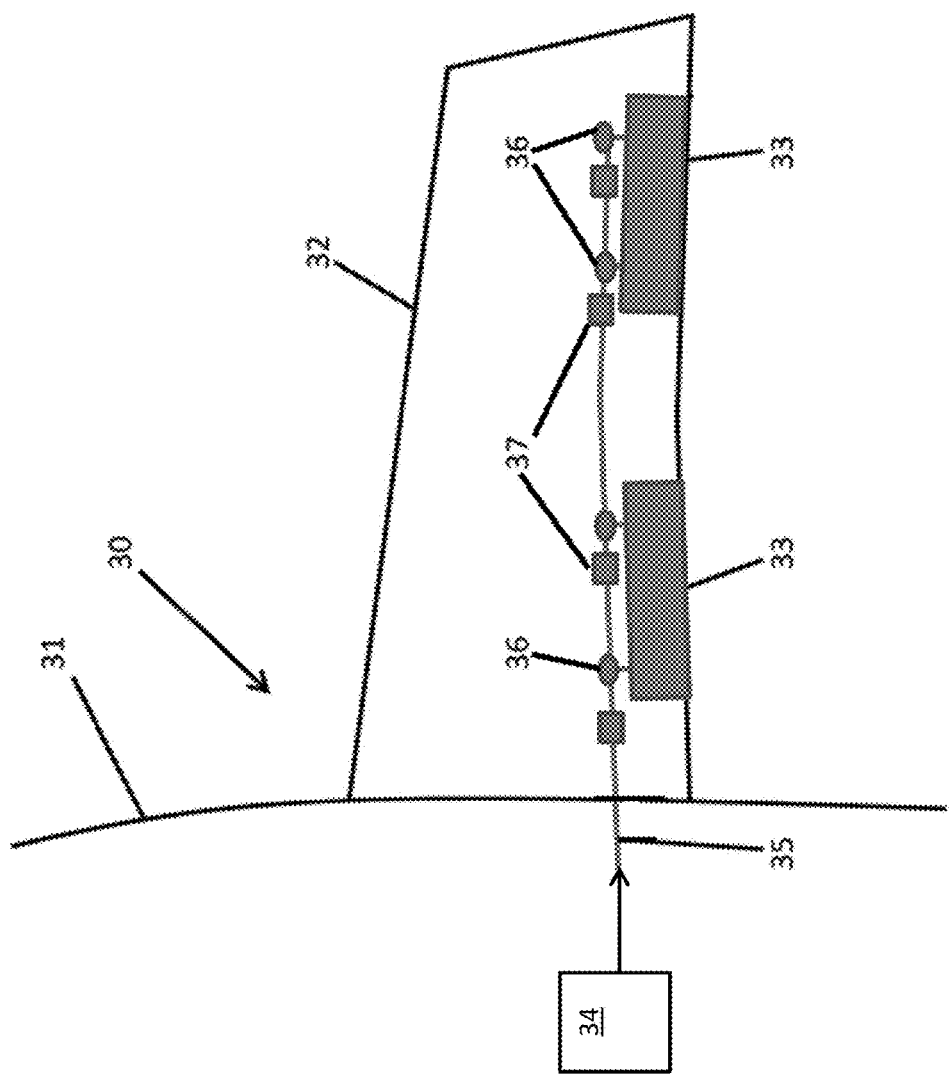
FIG. 1A is a partially cutaway top-down view of a portion of an aircraft in accordance with embodiments.

In the exemplary cases of FIGS. 1A and 1B, the aircraft 30 includes a fuselage 31 and a wing 32 extending outwardly from the fuselage 31. The wing 32 includes one or more flight control surfaces 33, such as slats or flaps, that are arranged along a trailing edge of the wing 32 and which are pivotable relative to a major plane of the wing 32 for executing various flight maneuvers. The pivoting of the flight control surfaces 33 is driven by a control unit 34 which is coupled to the flight control surfaces 33 by way of a drivetrain 35 and a series of linear or rotary actuators 36. Torque for powering the pivoting is generated in the control unit 34 and transmitted along the drivetrain 35 through one or more torque-limiters 37 that may be separate from (see FIG. 1A) or integrated within (see FIG. 1B) the actuators 36.

Each of the torque-limiters 37 operate by preventing application of excessive load to aircraft structures in the case of an external issue. Often, the actuators 36 fail as a result of internal tare losses that exceed design parameters due to water ingress or faulty maintenance leading to corrosion or gear wear. The failure in turn leads to high input torque being required to make the actuator 36 move or respond. Eventually, the problem decays until the required torque exceeds a threshold of the torque-limiters 37.

Conventional torque-limiter systems include tripped spring indicators that provide a visual indication of a trip incident. This trip indication needs to be observed, however, and such observation is typically preceded by removal of one or more aircraft panels. As will be described herein, a sensor is provided to sense conditions of the torque-limiters 37 which do not necessarily rise to the level of a full tripping incident. Such conditions, once sensed or detected, may be compared against prior flight data and other information to aid in a determination that maintenance is or is not required.

Figure 2:
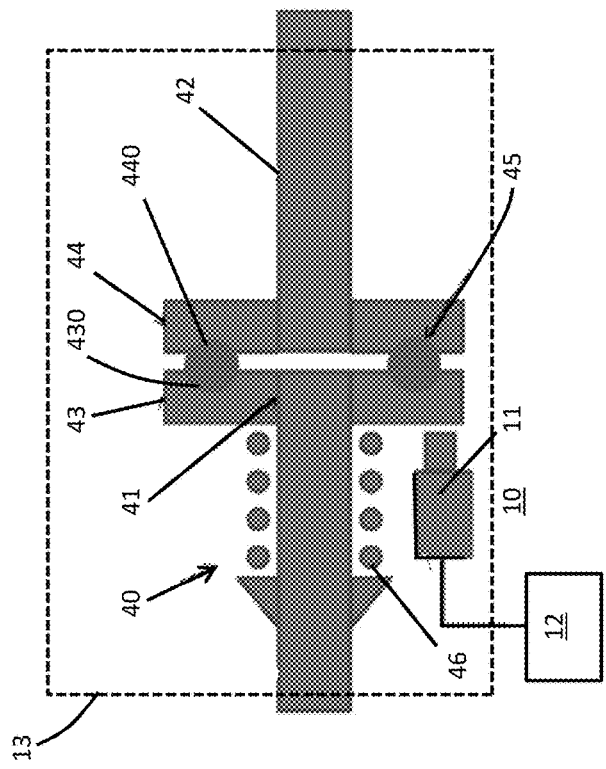
FIG. 2 is a schematic diagram of a predictive system for use with a torque-limiter of the aircraft of FIGS. 1A and 1B.

As shown in FIG. 2, a torque-limiter 37 may be provided as a ball-ramp mechanism 40 in an exemplary case. The ball-ramp mechanism 40 includes an input shaft 41 and an output shaft 42 which may be components of the drivetrain 35 of FIGS. 1A and 1B. The ball-ramp mechanism 40 further includes a first plate 43 to which the input shaft 41 is coupled, a second plate 44 to which the output shaft 42 is coupled, a ball element 45 which is disposable within complementary recesses 430 and 440 in the first and second plates 43 and 44, respectively, and a spring-loading assembly 46 that biases the first plate 43 toward the second plate 44 on either side of the ball element 45.

During normal operations, the ball element 45 is secured within the complementary recesses 430 and 440 so that torque can be transmitted from the input shaft 41, to the first plate 43, to the ball element 45, to the second plate 44 and finally to the output shaft 42. However, in a case in which elevated torque is applied to the ball-ramp mechanism 40 as a result of, for example, the corresponding actuator 36 being corroded but not excessively corroded, the ball element 45 may translate slightly outwardly from the recesses 430 and 440 without actually leaving the recesses 430 and 440. This will have the effect of pushing the first and second plates 43 and 44 slightly apart but will still permit torque transmission from the input shaft 41 to the output shaft 42. In a case in which excessive torque is applied to the ball-ramp mechanism 40 as a result of, for example, the corresponding actuator 36 being excessively corroded, exhibiting degraded lubrication, exhibiting excessive gear or bearing wear or experiencing an introduction of foreign material (e.g., sand, dust, etc.) or in the case of degradation of another related or unrelated component, the ball element 45 may translate completely out from the recesses 430 and 440. This will have the effect of pushing the first and second plates 43 and 44 apart and will prevent torque transmission from the input shaft 41 to the output shaft 42.

The predictive system 10 includes at least one or more sensors (hereinafter referred to as "a sensor") 11, a processing system 12 and a housing 13 in which the torque-limiter 37/ball-ramp mechanism 40 and the sensor 11 are mounted so as to be normally fixed relative to one another. The sensor 11 may be provided as at least one or more of an optical sensor, an electromagnetic sensor, a Hall Effect sensor, a linear variable differential transformer (LVDT) sensor and a capacitive sensor. In any case, the sensor 11 is disposed to sense a condition of the torque-limiter 37 or, more particularly, the ball-ramp mechanism 40. In accordance with embodiments, sensor 11 may sense a first distance D1 (see FIGS. 4-6) between the first plate 41 and the sensor 11 such that the sensor 11 effectively senses a second distance D2

(see FIGS. 4-6) between the first and second plates 41 and 42. Here, the first and second distances D1 and D2 may but are not required to extend along a dimension that is defined along a longitudinal axis of the input and output shafts 41 and 42.

Figure 3:
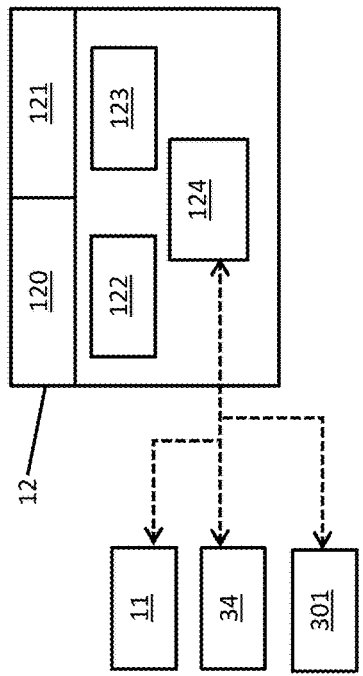
FIG. 3 is a schematic diagram of a processing system of the predictive system of FIG. 2.

With continued reference to FIG. 2 and with additional reference to FIG. 3, the processing system 12 is coupled to the sensor 11 and, in some cases, to at least one or more of the control unit 34 and a flight control computer (FCC) 301 of the aircraft 30. The processing system and configured to process readings of the sensor 11, to calculate whether the second distance D2 between the first and second plates 41 and 42 is indicative of degradation or failure incidents in at least any one or more of the drivetrain 35 (see FIGS. 1A and 1B), the actuators 36 (see FIGS. 1A and 1B) and the ball-ramp mechanism 40 based on the readings being processed and to determine whether an action should be taken based on a calculation result. To this end, the processing system 12 may include or be provided as at least one or more of a controller 120 and a prognostic maintenance computer 121. In any case, the processing system 12 may include a processor 122, such as a central processing unit (CPU), a memory unit 123 and a networking unit 124 by which the processor 122 is communicative with the sensor 11 and, where applicable, the control unit 34 and the FCC 301. The memory unit 123 has data stored thereon which is reflective of at least historical sensor readings 11 from the ball-ramp mechanism 40 or from other ball-ramp mechanisms and executable instructions. When executed by the processor 122, the executable instructions cause the processor 122 and the processing system 12 as a whole to operate as described herein.

Exemplary operations of the processing system 12 will now be described with reference to FIGS. 4-6.

As shown in FIG. 4, the ball-ramp mechanism 40 is operating normally with the ball element 45 secured in the recesses 430 and 440. As such, the sensor 11 senses that the first distance D1 between the sensor 11 and the first plate 43 is large enough to infer that the second distance D2 is short due to the ball element 45 being secured in the recesses 430 and 440.

As shown in FIG. 5, the ball-ramp mechanism 40 is able to transmit torque but is not operating normally due to the ball element 45 translating slightly outwardly from the recesses 430 and 440. As such, the sensor 11 senses that the first distance D1 between the sensor 11 and the first plate 43 is reduced as compared to the first distance D1 of FIG. 4 and thus it can be inferred that the second distance D2 is correspondingly elevated due to the ball element 45 being unsecured in but not completely removed from the recesses 430 and 440.

As shown in FIG. 6, the ball-ramp mechanism 40 is incapable of transmitting torque due to the ball element 45 being completely removed from the recesses 430 and 440. As such, the sensor 11 senses that the first distance D1 between the sensor 11 and the first plate 43 is reduced as compared to the first distance D1 of FIG. 5 and thus it can be inferred that the second distance D2 is correspondingly elevated as compared to the second distance D2 in FIG. 5 due to the ball element 45 being completely removed from the recesses 430 and 440.

For the case illustrated in FIG. 5, the condition of the torque-limiter 37 is indicative of an increased torque but not necessarily a torque overload due to the second distance D2 between the first and second plates 43 and 44 of the ball-ramp mechanism 40 exceeding a first threshold but not reaching a second threshold. In this case, the processing system 12 may predefine the first threshold in accordance with at least the structural features of the ball-ramp mechanism 40 and the historical data of the memory unit 123 and take an action which is consistent with a conclusion that the condition is indicative of some degradative incident in the drivetrain 35, the actuator 36 or the torque-limiter 37/ball-ramp mechanism 40. Such action may include identifying a location of the torque-limiter 37 in question so that remote panel removal and inspection is not needed and at least one of instructing the control unit 34 to reduce applied torque by way of the controller 120 and arranging for maintenance by way of the prognostic maintenance computer 121 (e.g., scheduling an inspection or repair, ordering parts, etc.).

For the case illustrated in FIG. 6, the condition of the torque-limiter 37 is indicative of a torque overload due to the second distance D2 between the first and second plates 43 and 44 of the ball-ramp mechanism 40 reaching or substantially reaching the second threshold (the second threshold may not be able to be exceeded). In this case, the processing system 12 may take an action which is consistent with a conclusion that the condition is indicative of some failure incident in the drivetrain 35, the actuator 36, the torque-limiter 37 or the ball-ramp mechanism 40. Such action may include identifying a location of the torque-limiter 37 in question so that remote panel removal and inspection is not needed, instructing the control unit 34 to reduce or cease applied torque by way of the controller 120 and arranging for maintenance by way of the prognostic maintenance computer 121 (e.g., scheduling an inspection or repair, ordering parts, etc.).

Figure 7:
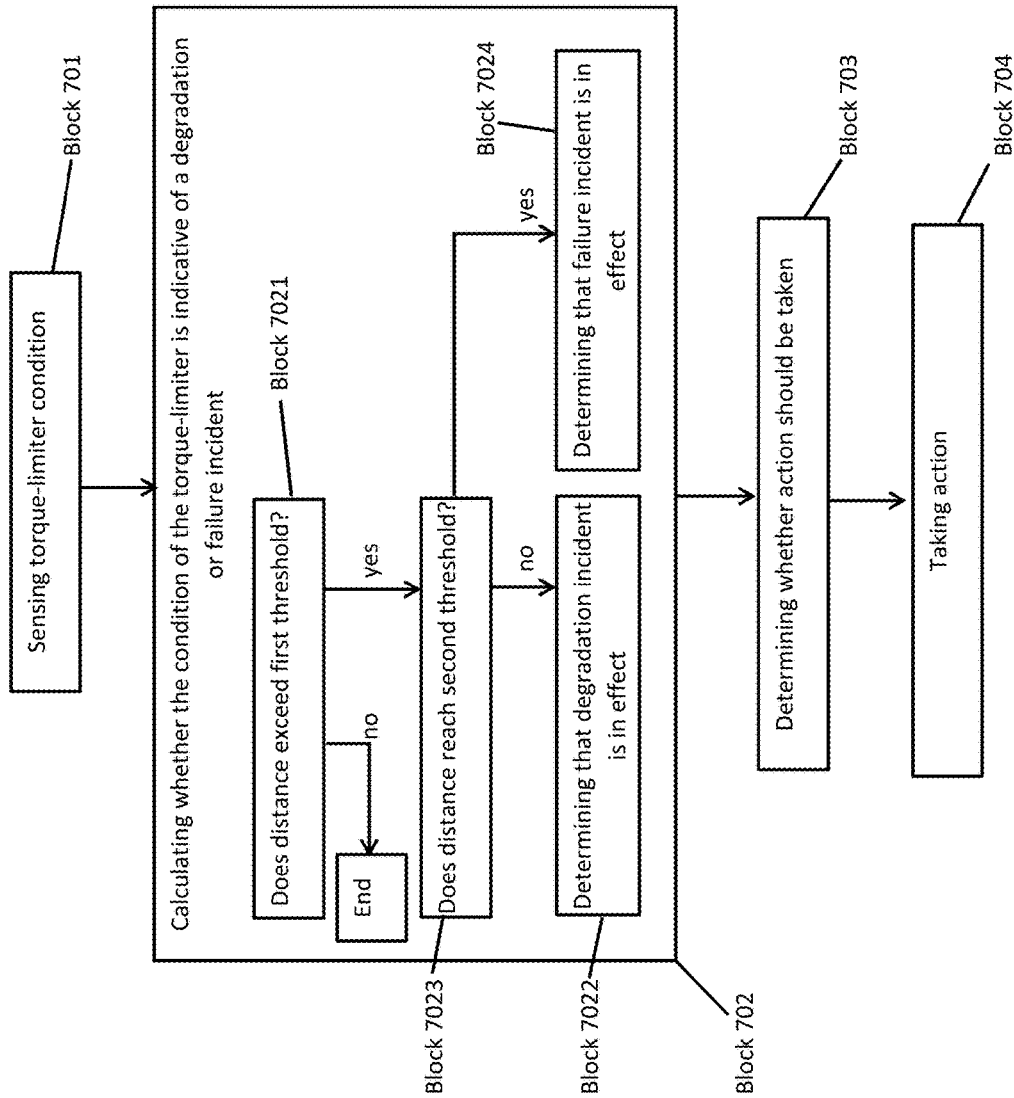
FIG. 7 is a flow diagram illustrating a method of operating a predictive system in accordance with embodiments.

With reference to FIG. 7, a method of operating a predictive system for a torque-limiter as described above is provided. As shown in FIG. 7, the method includes sensing a condition of the torque-limiter, such as a distance between plates of a ball-ramp mechanism (block 701), calculating whether the condition of the torque-limiter is indicative of a degradation or failure incident (block 702), determining whether an action should be taken based on a calculation result (block 703) and taking the action based on a result of the determining of block 703 (block 704).

In accordance with embodiments, the calculating of block 702 may include calculating that the distance exceeds a first threshold without reaching a second threshold (block 701), determining that the condition is indicative of the degradation incident based on the distance exceeding the first threshold without reaching the second threshold (block 7022), calculating that the distance reaches the second threshold (block 7023) and determining that the condition is indicative of the failure incident based on the distance reaching the second threshold (block 7024).

In accordance with further embodiments, in an event of a degradation incident, the action may include identifying a location of the torque-limiter in question so that remote panel removal and inspection is not needed and at least one of instructing the control unit to reduce applied torque by way of the controller and arranging for maintenance by way of the prognostic maintenance computer (e.g., scheduling an inspection or repair, ordering parts, etc.). Meanwhile, in an event of a failure incident, the action may include identifying a location of the torque-limiter in question so that remote panel removal and inspection is not needed, instructing the control unit to reduce applied torque by way of the controller and arranging for maintenance by way of the prognostic maintenance computer (e.g., scheduling an inspection or repair, ordering parts, etc.).

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A predictive system, comprising:
   a torque-limiter comprising a ball-ramp mechanism;
   a sensor disposed to sense a condition of the torque-limiter, the condition comprising a distance between plates of the ball-ramp mechanism; and
   a processing system coupled to the sensor and configured to process readings of the sensor, to calculate whether the condition of the torque-limiter is indicative of degradation or failure incidents based on the readings being processed and to determine whether an action should be taken based on a calculation result,
   wherein the processing system calculates that the distance between the plates is indicative of the degradation or failure incidents based on the distance exceeding a first threshold or reaching a second threshold, respectively.

2. The predictive system according to claim 1, wherein:
   the plates of the ball-ramp mechanism comprise first and second plates and the distance between the plates comprises a distance between interior faces of the first plate and the second plate,
   the predictive system further comprises a housing in which the torque-limiter and the sensor are mounted so as to be normally fixed relative to one another, and
   the sensor is configured to sense a distance between the sensor and an exterior face of the first plate from which the processing system calculates the distance between the plates when the degradation or failure incidents are in effect.

3. The predictive system according to claim 1, wherein the sensor comprises at least one or more proximity sensors.

4. The predictive system according to claim 1, wherein the at least one or more proximity sensors comprise at least one or more of an optical sensor, an electromagnetic sensor, a Hall Effect sensor, a linear variable differential transformer (LVDT) sensor and a capacitive sensor.

5. The predictive system according to claim 1, wherein the processing system comprises at least one or more of a controller and a prognostic maintenance computer.

6. The predictive system according to claim 1, wherein the action comprises arranging maintenance.

7. A predictive system for a ball-ramp mechanism comprising a first plate to which an input shaft is coupled, a second plate to which an output shaft is coupled and a ball element which is disposable within complementary recesses in interior faces of the first and second plates, the predictive system comprising:
   a sensor disposed to sense a distance between the interior faces of the first and second plates in a dimension defined along a longitudinal axis of the input and output shafts; and
   a processing system coupled to the sensor and configured to process readings of the sensor, to calculate whether the distance between the interior faces of the first and second plates is indicative of degradation or failure incidents based on the readings being processed and to determine whether an action should be taken based on a calculation result,
   wherein the processing system calculates that the distance between the interior faces of the first and second plates is indicative of the degradation or failure incidents based on the distance between the interior faces of the first and second plates exceeding a first threshold or reaching a second threshold, respectively.

8. The predictive system according to claim 7, wherein:
   the predictive system further comprises a housing in which the ball-ramp mechanism and the sensor are mounted so as to be normally fixed relative to one another, and
   the sensor is configured to sense a distance between the sensor and an exterior face of the first plate from which the processing system calculates the distance between the interior faces of the first and second plates when the degradation or failure incidents are in effect.

9. The predictive system according to claim 7, wherein the sensor comprises at least one or more proximity sensors.

10. The predictive system according to claim 7, wherein the at least one or more proximity sensors comprise at least one or more of an optical sensor, an electromagnetic sensor, a Hall Effect sensor, a linear variable differential transformer (LVDT) sensor and a capacitive sensor.

11. The predictive system according to claim 7, wherein the processing system comprises at least one or more of a controller and a prognostic maintenance computer.

12. The predictive system according to claim 7, wherein the action comprises arranging maintenance.

13. A method of operating a predictive system for a torque-limiter comprising a ball-ramp mechanism with first and second plates, the method comprising:
   sensing a distance between a sensor and an exterior face of the first plate of the ball-ramp mechanism;
   determining a condition of the torque-limiter in accordance with results of the sensing, the condition comprising a distance between interior faces of the first and second plates of the ball-ramp mechanism;
   calculating whether the condition of the torque-limiter is indicative of degradation or failure incidents, wherein the calculating comprises calculating that the distance between the interior faces of the first and second plates of the ball-ramp mechanism exceeds a first threshold without reaching a second threshold and determining that the condition is indicative of the degradation incident based on the distance between the interior faces of the first and second plates of the ball-ramp mechanism exceeding the first threshold without reaching the second threshold; and
   determining whether an action should be taken based on a calculation result.

14. The method according to claim 13, wherein the calculating comprises:
   calculating that the distance between the interior faces of the first and second plates of the ball-ramp mechanism reaches the second threshold; and
   determining that the condition is indicative of the failure incident based on the distance between the interior faces of the first and second plates of the ball-ramp mechanism reaching the second threshold.

15. The method according to claim 13, further comprising taking the action based on a result of the determining of whether to take the action.

* * * * *